United States Patent [19]
Fairbanks et al.

[11] 3,951,124

[45] Apr. 20, 1976

[54] POLLUTION REDUCING AND FUEL SAVING DEVICE

[75] Inventors: Eugene A. Fairbanks, Calloway, Minn.; Robert D. Fairbanks, Haines, Alaska

[73] Assignee: Robert D. Fairbanks, Haines, Alaska

[22] Filed: Apr. 29, 1974

[21] Appl. No.: 464,747

[52] U.S. Cl. .................. 123/122 E; 123/122 AB; 165/51
[51] Int. Cl.[2] ..................................... F02M 31/00
[58] Field of Search... 123/122 A, 122 AB, 122 AC, 123/122 E, 127, 52 MV; 165/52, 51

[56] References Cited
UNITED STATES PATENTS

| | | | |
|---|---|---|---|
| 1,102,478 | 7/1914 | Crowder | 165/52 |
| 1,325,850 | 12/1919 | Humphreys | 123/122 A |
| 2,175,126 | 10/1939 | McCormick | 165/52 |
| 3,253,647 | 5/1966 | Deshares | 123/122 E |
| 3,472,214 | 10/1969 | Moon | 123/122 E |

FOREIGN PATENTS OR APPLICATIONS

| | | | |
|---|---|---|---|
| 153,423 | 11/1920 | United Kingdom | 165/52 |

*Primary Examiner*—Charles J. Myhre
*Assistant Examiner*—R. H. Lazarus
*Attorney, Agent, or Firm*—Burd, Braddock & Bartz

[57] ABSTRACT

An auxiliary device for attachment to internal combustion engines for the purpose of reducing the objectionable polluting constituents of the exhaust gases therefrom and reducing the amount of fuel consumed. The device functions to reduce pollution by reducing the production of objectionable exhaust gas contaminants through more efficient combustion of the fuel. Efficient fuel consumption is achieved by means for presenting the fuel to the carburetor in preheated atomized liquid form for admixture with air prior to introduction to the combustion chambers. The auxiliary device comprises a housing having separate passages for circulation of liquid fuel and water in heat exchanging relationship. In addition to reducing pollution, use of the device effects fuel savings through more efficient fuel consumption.

8 Claims, 5 Drawing Figures

POLLUTION REDUCING AND FUEL SAVING DEVICE

This invention relates to an auxiliary pollution reducing and fuel saving device for use in connection with internal combustion engines to reduce the contaminants in the exhaust gas and the amount of fuel consumed through more efficient fuel consumption. Besides reducing pollution, use of the system improves the dependability, efficiency and performance of internal combustion engines and renders the engines more economical to operate by minimizing fuel consumption. While enhancing the quality of the environment by reducing objectionable contaminants ordinarily spewed into the atmosphere from engine exhausts, use of the system of the present invention alleviates some of the adverse effects of higher prices and short supplies of available fuels resulting from the current energy crisis. These objectives are achieved through use of a heating unit through which the fuel is passed in heat exchanging relationship with radiator fluid to preheat the fuel in liquid form for atomization into the carburetor.

The exhaust gases from the average automobile and similar vehicles powered by internal combustion engines contain a mixture of carbon monoxide, carbon dioxide, unburned or partially burned hydrocarbons, nitrogen, some of the nitrogen oxides, etc. These exhaust gases contribute to the production of smog and similar forms of air pollution in such quantities as to be considered objectionable and potentially harmful. The federal government and states, led by California, have legislated increasingly stringent requirements for control of emissions from automotive engines.

Efforts to meet present and anticipated requirements have led to the addition of complicated and expensive catalytic mufflers and after-burners, and the like, designed to treat the exhaust gases and resulting in increased fuel consumption, decreased engine efficiency and decreased mileage. Resistance to compliance with pollution control requirements has increased as shortages of available fuel have curtailed ready availability of fuel and caused sharp price increases.

Heretofore, efforts toward abatement of vehicle exhaust pollution has been directed to treatment of the exhaust gases which already contain the objectionable contaminants. The present invention is directed toward abatement of pollution at the source by promoting more efficient combustion of the fuel so as to minimize production of contaminants in the combustion chamber. This is done by preheating the fuel prior to combustion by means of a simple efficient heat exchanger unit as described in detail herein. It has been found that the result is less exhaust pollution with possible 30 to 40 per cent improvement when the unit is used in a car with a conventional exhaust system, as compared to the same vehicle without the unit. There is significant reduction of disagreeable odor indicating reduction of hydrocarbon contaminants. The carbon dioxide content of the exhaust is higher indicating the presence of less carbon monoxide and better combustion of carbon monoxide. At the same time, through more efficient engine operation, better mileage is achieved resulting in more economical use of fuel.

The improved dependability, efficiency and performance of a vehicle engine with which the pollution control is used is especially significant in minimizing fuel consumption and resulting in economical operation when the engine is operated under cold weather conditions. It is well known that internal combustion engines such as are commonly used in automobiles, trucks, buses and various other types of automotive vehicles, are relatively less efficient when operated in low temperatures such as are common in northern climes during the winter months. Most of the northern regions of the United States are subjected to subzero temperatures each winter for periods ranging from a few days to several weeks. Portions of Alaska and Northern Canada are subjected to extreme subzero temperatures down as low as −70° F. The loss of dependability, efficiency and performance of internal combustion engines during cold winter months is due largely to the inability of the usual carbureting systems to adequately and thoroughly atomize the cold raw liquid hydrocarbon fuel as it is delivered into the combustion chambers of the engine.

Numerous attempts have heretofore been made to provide means for preheating the liquid fuel before delivery to the engine cylinders, but none has proved entirely satisfactory such that it has found widespread acceptance by those who live in areas subjected to extreme cold weather or those providing vehicles for use in such climates. One example of such a prior art system is found in the prior U.S. Pat. No. 2,748,758, issued June 5, 1956 to one of the present applicants. The system of that patent proved to be unduly complex rendering it expensive to manufacture and subject to malfunction due to problems associated with vaporization and condensation of the fuel.

Wolf U.S. Pat. No. 1,550,862, issued Aug. 25, 1925, is concerned with an internal combustion engine utilizing low-grade fuels including the concept of heating the fuel "to the most suitable temperature." The fuel passes through a coil located within the header through which radiator fluid flows, and thence through an insulated or jacketed pipe to the carburetor.

Mengelkamp et al. U.S. Pat. No. 2,788,779, issued Apr. 16, 1957, relates to apparatus for vaporizing liquid petroleum gases such as butane, propane, and the like, to a heat exchanger and thence to the carburetor. The heat exchanger uses bypassed radiator fluid.

Lundi U.S. Pat. No. 3,110,296, issued Nov. 12, 1963, is directed to a fuel heater in which the fuel passes through a coil within a jacket through which hot water flows on its way to the vehicle heating system. Alternatively, unheated fuel may be supplied to the carburetor, or a mixture of unheated and preheated fuel.

Deshaies U.S. Pat. No. 3,253,647, issued May 31, 1966, likewise shows a fuel preheater in which the fuel passes through a spiral coil in heat exchanging relationship with radiator fluid passing through a jacket surrounding the coil. This device is characterized primarily by having a cold air passage extending through the jacket within the coil carrying the fuel so as to equalize the temperature on opposite sides of the turns of the coil.

Johnson U.S. Pat. No. 3,380,442, issued Apr. 30, 1968, is directed to a so-called fuel evaporating "economizer." The fuel is initially heated by means of an electrical heating element until such time as the engine is heated sufficient that the exhaust may be used to heat and vaporize the liquid fuel.

Pantano U.S. Pat. No. 3,509,859, issued May 5, 1970, is directed to fuel atomizing and air mixture means and includes a heat exchanger through which radiator fluid circulates and through which the fuel passes within a coil on its way to the atomizing unit.

Farr U.S. Pat. No. 3,738,334, issued June 12, 1973, is directed to an emission reduction system including a chamber heated by engine exhaust in which gasoline may be vaporized.

None of these patents suggests any relationship between preheating of fuel and pollution control. The principal object of the present invention is to provide a simplified fuel system for internal combustion engines embodying a pollution control unit in the form of means for preheating the liquid hydrocarbon fuel prior to delivery to the usual engine carburetor where the liquid fuel may be thoroughly and completely atomized to provide a highly combustible fuel mixture which may be readily ignited for more complete and efficient combustion in the combustion chambers of the engines, without regard to ambient conditions, especially subfreezing and subzero atmospheric temperatures.

The invention is illustrated in the accompanying drawings in which corresponding parts are identified by the same numerals and in which.

Figure 1:
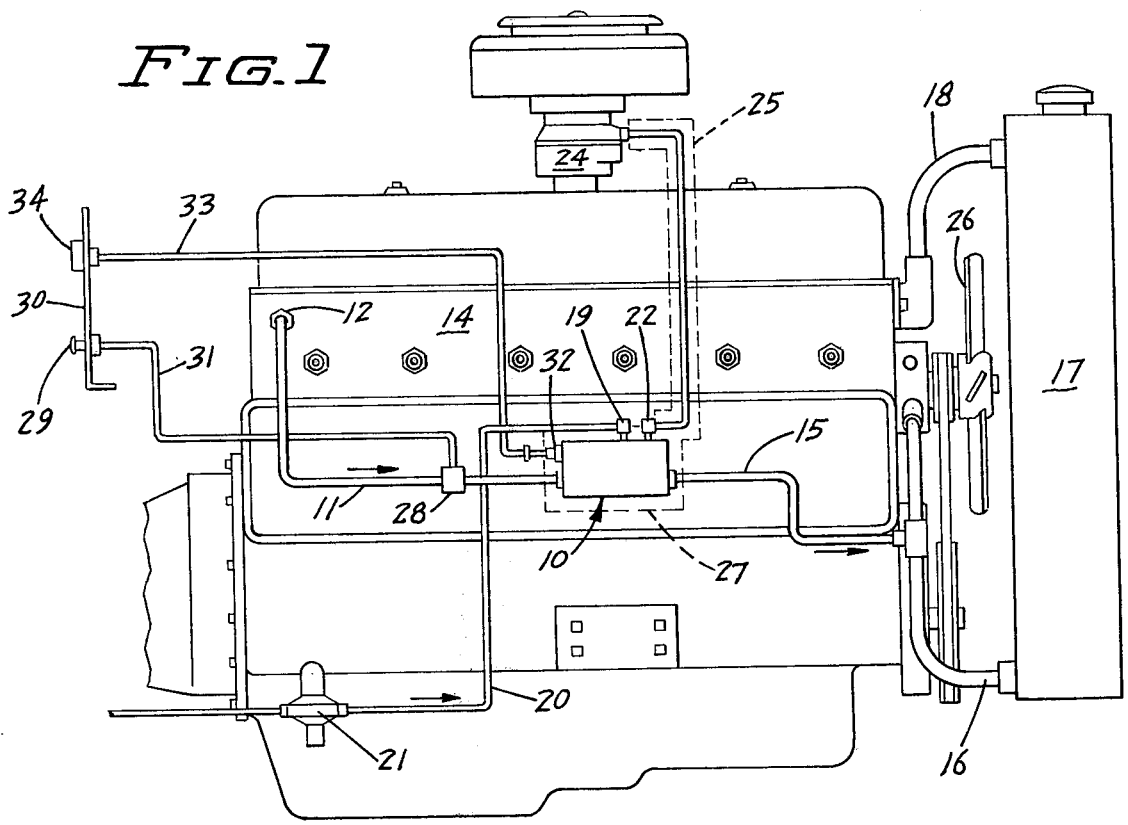
FIG. 1 is a side elevational view of an internal combustion engine schematically illustrating the pollution control invention applied thereto.
Figure 2:
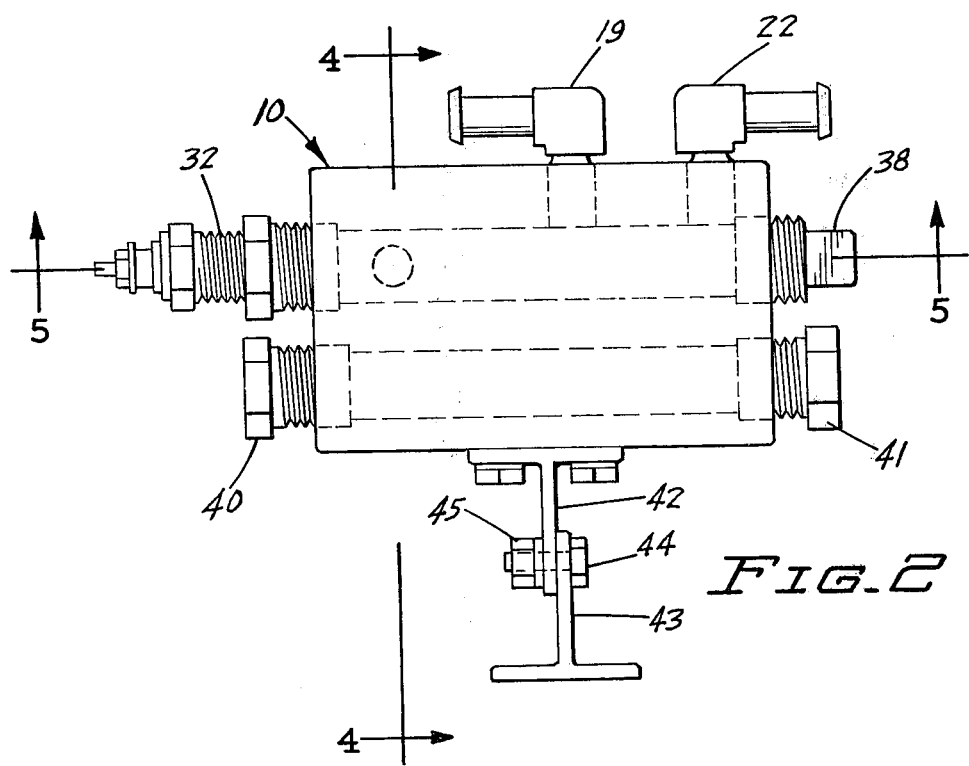
FIG. 2 is a side elevation of the fuel heating pollution control unit comprising part of the fuel system.
Figure 3:
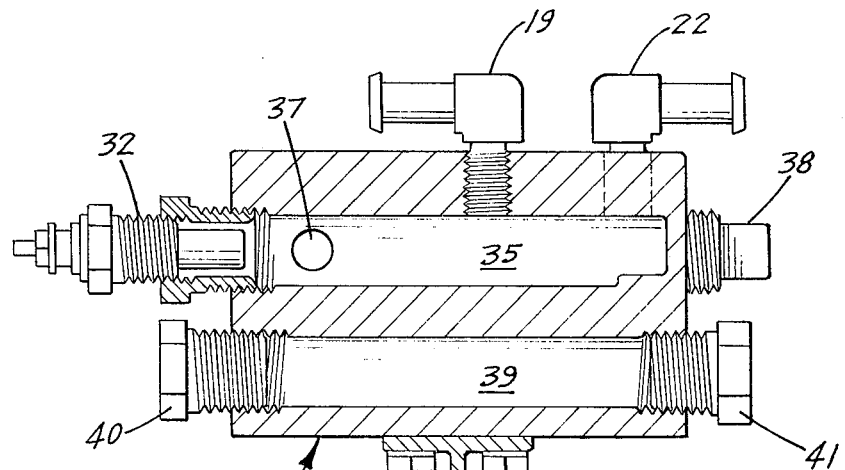
FIG. 3 is a similar elevation in vertical cross section on the line 3—3 of FIG. 4 and in the direction of the arrows.
Figure 5:
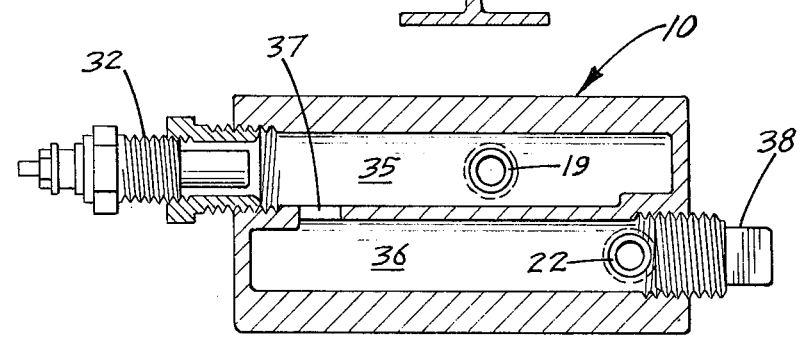
FIG. 5 is a horizontal section on the line 5—5 of FIG. 2 and in the direction of the arrows.
Figure 4:
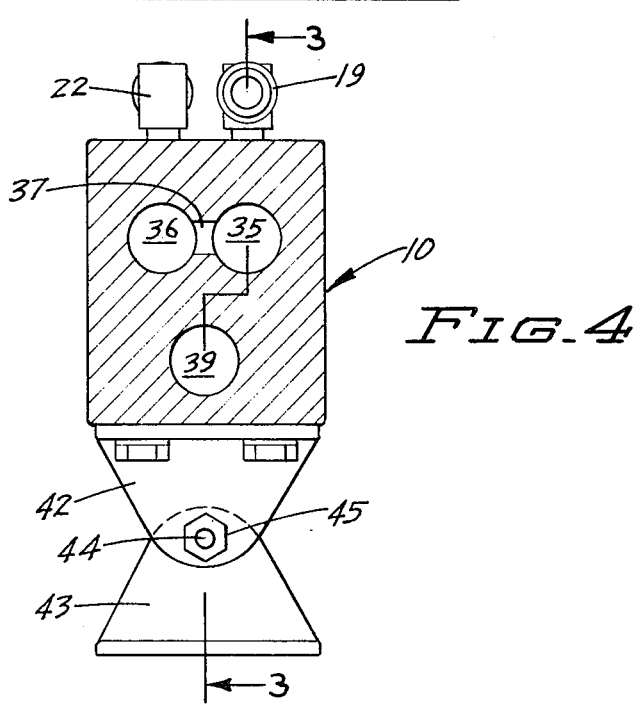
FIG. 4 is a transverse vertical section on the line 4—4 of FIG. 2 and in the direction of the arrows.

Referring now to the drawings and particularly to FIG. 1, the fuel system for internal combustion engines according to the present invention comprises a fuel heating pollution control unit, indicated generally at 10. The inlet to the housing of unit 10 is connected by a hose or similar conduit 11 to a source of circulating hot water such as fitting 12 communicating from the usual water circulating jacket of the vehicle engine 14. A further hose or similar conduit 15 connects the discharge of the housing of unit 10 to the usual water circulating conduit 16 of the engine radiator 17 which connects the lower end of the radiator to the usual water circulating pump of the engine. The upper portion of the radiator 17 is in communication with the water circulating jacket of the engine by the usual hose or similar conduit 18. Instead of being connected into the water circulating jacket of the vehicle engine and the radiator water circulating conduit as shown, unit 10 may alternatively be connected through hoses or similar conduits 11 and 15 into the vehicle heater supply and return hoses, respectively.

Gasoline or similar hydrocarbon fuel at ambient temperature is delivered from the fuel tank to the inlet fitting 19 of the unit 10 through fuel line 20 by means of the usual fuel pump 21 of the vehicle. Preheated fuel is discharged through fitting 22 of unit 10 through fuel line 23 to the usual carburetor 24 of the vehicle engine.

Fuel line 23 carrying the preheated fuel to the carburetor, is optionally and desirably provided with a coating or jacket of heat insulating material, as indicated by broken lines 25, so as to be insulated against heat loss. This protects the preheated fuel against the cooling effect of both the ambient temperature and radiator fan 26. Unit 10 is desirably also provided with a coating of heat insulating material or an insulating jacekt 27, as shown in broken lines, to protect it against the cooling effect of the ambient temperature for maximum utilization of the circulating hot water.

A manually controlled on-off valve 28 is interposed in either water supply line 11, as shown, or water return line 15, to control the flow of hot water through the heating unit. Valve 28 is manually controlled by a plunger knob or button 29 located on the vehicle dashboard 30 and mechanically connected to the valve through a stiff wire or rod or through a flexible wire or rod encased in a cable sheath. Optionally the unit 10 may be equipped with a temperature sensor 32 connected through electrical conductor means 33 to a gasoline temperature indicating gauge 34 located on the vehicle dashboard. Likewise, manually controlled valve 28 may optionally be replaced with a solenoid operated valve connected to operate in response to sensed temperature changes to shut the hot water flow off and on as required to maintain the fuel at the desired temperature.

Referring now to FIGS. 2 through 5, the structure of the fuel heating pollution control unit is shown in greater detail. The housing of unit 10 is formed from a unitary block of metal having good heat conducting properties, such as aluminum or aluminum alloys composed predominantly of aluminum. The housing is provided with a plurality of elongated longitudinal parallel spaced apart fuel chambers 35 and 36, each pair of such passages being interconnected adjacent one end through a duct or passage 37 through the body wall separating the chambers so as to provide a circuitous serpentine fuel flow path through the chambers. The diameter of passage 37 is slightly less than that of the chambers to slightly retard the flow of fuel.

One wall of chamber 35 is tapped to receive inlet fitting 19. Similarly, one wall of chamber 36 is tapped to receive discharge fitting 22. The housing of unit 10 may be formed, for example, by casting or by drilling the appropriate chambers in a solid block of heat conductive metal. In any event, the open ends of the chambers are closed by appropriate means, such as temperature sensor 32 or plug 38.

At least one other elongated chamber 39 is provided for passage of a heating fluid through the housing of unit 10. Passage 39 extends generally longitudinally and parallel to passages 35 and 36 but not in fluid communication therewith. Chamber 39 is spaced closely enough from chambers 35 and 36 to establish a heat exchanging relationship through the heat conductive metal of which the housing of unit 10 is formed so that the higher temperature fluid passing through chamber 39 raises the temperature of the lower temperature fuel passing through chambers 35 and 36. One end of chamber 39 is tapped and provided with a fitting 40 for connection to hot water conduit 11 and the opposite end of chamber 39 is tapped to receive fitting 41 for connection to conduit 16 for return of hot water to the radiator after passage through the chamber. Desirably the vehicle with which the unit is used is provided with a tank heater so that warm fuel is immediately available upon starting the vehicle.

For most efficient functioning, the pollution reducing and gas saving device of the present invention is desirably mounted in as close proximity to the engine block as is feasible. To provide as much adaptability as possible in mounting, unit 10 is desirably provided with a flexible pivoted mounting bracket. The bracket is comprised of a projecting plate or ear 42 affixed to the unit by screws or other suitable attachment means and a similar plate or ear 43 adapted for attachment to a convenient part of the automotive vehicle or engine. The free ends of plates 42 and 43 are disposed in overlapping relationship and pivotally joined together, as by means of bolt 44 and nut 45. After mounting of the unit in the desired location, the bracket is locked against further pivotal movement by tightening of nut 45.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A pollution reducing and fuel saving device in combination with a liquid-cooled internal combustion engine including a carburetor and a fuel supply tube for conducting fuel to the carburetor, a radiator, and flow lines extending from the radiator to the liquid circulating jacket of the engine, said device comprising:
    A. a housing formed of a unitary solid block of metal having good heat conductive properties,
    B. a plurality of longitudinal substantially parallel spaced apart generally circular cross-section fuel passage chambers formed integrally in said housing,
        each adjacent pair of said chambers being interconnected adjacent one end to provide a serpentine fuel flow path through said chambers,
    C. a fitting communicating with the first of said chambers and a further fitting communicating with the last of said chambers to connect said chambers to said fuel supply line,
    D. at least one further longitudinal generally circular cross section radiator liquid passage chamber formed integrally in said housing,
        said further chamber being substantially parallel to said fuel chambers and closely spaced apart therefrom in heat exchanging relation therewith,
    E. fittings communicating with said further chamber to connect said chamber into the radiator liquid flow of said radiator, and
    F. means for mounting said device on said internal combustion engine.

2. A device according to claim 1 further characterized in that said housing is formed of a material selected from the class consisting of aluminum and alloys thereof composed predominantly of aluminum.

3. A device according to claim 1 further characterized in that said housing is provided with a heat insulative coating.

4. A pollution reducing and fuel saving system comprising in combination:
    A. a liquid-cooled internal combustion engine including:
        1. a carburetor,
        2. a fuel supply tube for conducting fuel to the carburetor,
        3. a radiator, and
        4. conduits extending from the radiator to the liquid circulating jacket of the engine,
    B. a pollution reducing and gas saving device mounted on said engine, said device comprising:
        1. a housing formed of a unitary solid block of a metal having good heat conductive properties selected from the class consisting of aluminum and alloys thereof composed predominantly of aluminum,
        2. a plurality of longitudinal substantially parallel spaced apart generally circular cross-section fuel passage chambers formed integrally in said housing, each adjacent pair of chambers being interconnected adjacent one end to provide a serpentine fuel flow path through the chambers,
        3. a fitting communicating with the first of said chambers and a further fitting communicating with the last of said chambers connecting the chambers to the fuel supply line,
        4. at least one further longitudinal generally circular cross-section radiator liquid passage chamber formed integrally in said housing substantially parallel to said fuel chambers and closely spaced apart therefrom in heat exchanging relation therewith, and
        5. fittings communicating with said further chamber connecting said chamber into the conduits circulating liquid from the radiator to the liquid circulating jacket of the engine.

5. A system according to claim 4 further characterized in that said housing is provided with a heat insulative coating.

6. A system according to claim 4 further characterized in that the portion of said fuel supply tube extending from said housing to the carburetor is provided with a heat insulative coating.

7. A system according to claim 4 further characterized in that a liquid shut-off valve is disposed adjacent to the housing in one of said conduits circulating liquid from the radiator.

8. A system according to claim 4 further characterized in that a temperature sensor is disposed in one of said fuel passage chambers.

* * * * *